US007903166B2

(12) United States Patent
Daly

(10) Patent No.: US 7,903,166 B2
(45) Date of Patent: Mar. 8, 2011

(54) METHODS AND SYSTEMS FOR DISPLAY VIEWER MOTION COMPENSATION BASED ON USER IMAGE DATA

(75) Inventor: Scott J. Daly, Kalama, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 497 days.

(21) Appl. No.: 11/948,959

(22) Filed: Nov. 30, 2007

(65) Prior Publication Data

US 2008/0199049 A1 Aug. 21, 2008

Related U.S. Application Data

(63) Continuation-in-part of application No. 11/680,522, filed on Feb. 28, 2007.

(60) Provisional application No. 60/890,897, filed on Feb. 21, 2007.

(51) Int. Cl.
H04N 5/222 (2006.01)
(52) U.S. Cl. .................. 348/333.12; 348/208.1; 345/672
(58) Field of Classification Search .................. None
See application file for complete search history.

(56) References Cited

U.S. PATENT DOCUMENTS

| 4,637,571 | A | 1/1987 | Holder et al. |
| 5,497,191 | A | 3/1996 | Yoo et al. |
| 5,734,357 | A * | 3/1998 | Matsumoto ........................ 345/7 |
| 5,845,158 | A | 12/1998 | Ogawa et al. |
| 5,857,122 | A | 1/1999 | Miyamoto et al. |
| 6,317,114 | B1 * | 11/2001 | Abali et al. .................... 345/672 |
| 6,467,207 | B1 | 10/2002 | Jones et al. |
| 6,618,203 | B2 | 9/2003 | Nakamura et al. |
| 6,679,899 | B2 | 1/2004 | Wiener et al. |
| 7,081,870 | B2 | 7/2006 | Bronson |
| 7,088,516 | B2 | 8/2006 | Yagi et al. |
| 2002/0003591 | A1 | 1/2002 | Giannatto |
| 2002/0118339 | A1 * | 8/2002 | Lowe ............................ 351/209 |
| 2004/0070675 | A1 * | 4/2004 | Fredlund et al. ............ 348/208.1 |
| 2004/0100419 | A1 * | 5/2004 | Kato et al. ........................ 345/7 |
| 2004/0208394 | A1 * | 10/2004 | Kurata ........................... 382/275 |
| 2004/0227836 | A1 * | 11/2004 | Tanaka ....................... 348/333.11 |
| 2006/0044399 | A1 * | 3/2006 | Fredlund et al. ......... 348/207.99 |
| 2006/0280249 | A1 | 12/2006 | Poon |
| 2007/0071346 | A1 * | 3/2007 | Li et al. ........................ 382/254 |
| 2007/0126928 | A1 * | 6/2007 | Klompnhouwer et al. ... 348/497 |

FOREIGN PATENT DOCUMENTS

| JP | 8-328519 A | 12/1996 |
| JP | 10-69266 A | 3/1998 |
| JP | 2004-343622 A | 12/2004 |

OTHER PUBLICATIONS

International Search Report PCT/JP2008/072109.

* cited by examiner

*Primary Examiner* — Lin Ye
*Assistant Examiner* — Dennis Hogue
(74) *Attorney, Agent, or Firm* — Krieger Intellectual Property, Inc.; Scott C. Krieger

(57) ABSTRACT

Embodiments of the present invention comprise systems and methods for compensating for motion of a viewer relative to a display device.

15 Claims, 8 Drawing Sheets

METHODS AND SYSTEMS FOR DISPLAY VIEWER MOTION COMPENSATION BASED ON USER IMAGE DATA

RELATED REFERENCES

This application is a continuation-in-part of U.S. patent application Ser. No. 11/680,522, entitled "Methods and Systems for Display Viewer Motion Compensation," filed Feb. 28, 2007, by Scott J. Daly; which claims the benefit of U.S. Provisional Patent Application No. 60/890,897, entitled "Methods and Systems for Display Viewer Motion Compensation," filed Feb. 21, 2007, by Scott Daly.

FIELD OF THE INVENTION

Embodiments of the present invention comprise methods and systems for modifying a displayed image to compensate for relative motion between a viewer's head and a display.

BACKGROUND

Mobile displays are increasingly being used to watch video. Currently their quality, in terms of pixel dimensions, contrast ratio, color gamut and bit-depth are typically inferior to stationary counterparts such as LCD TVs. However, in some applications, the quality lost due to these inferiorities may be acceptable when balanced with the increased convenience of a smaller mobile display. While the quality and performance of mobile displays is rapidly increasing, their size is an element of their portability and will always be less than that of stationary devices. The small size of these mobile displays generally results in a smaller field of view, which may be quantified in visual degrees. Viewing distance may also affect the field of view and a varying viewing distance can have a detrimental impact on viewing quality.

An important and frequent application for mobile displays is viewing image and video content during transportation. This may occur while commuting or traveling on a bus, subway, train, airplane or other vehicle. Even vehicle operators may use mobile or compact vehicle displays for navigation and vehicle condition assessment. Small displays are often used for automobile and airplane navigation and instrumentation. In these transportation applications, there is often a great deal of movement of the user relative to the display. This is often the result of irregular roadway surfaces or atmospheric conditions, which can jostle and bump a user relative to the vehicle and/or display. This movement often results in an undesirable and aperiodic vibration or random shaking, which makes video and image consumption difficult.

During transportation, a display may be difficult to see for a number of reasons. Fine details (high spatial frequencies) may be "smeared" due to motion blur. This can be caused by relative motion between the display and the eye combined with the eye's temporal response. Multiple edges can also cause undesirable masking throughout the image. The shaking display may contain multiple edges due to saccadic eye movements that don't land where they are anticipated due to the relative motion. Motion sickness can also affect video quality. This may be caused by a mismatch between eye movements and the vestibular canals of the ear. Headaches also often result from video consumption while traveling. This may result from excessive corrective eye movements and possible motion blur and multiple edge factors.

SUMMARY

Some embodiments of the present invention comprise methods and systems for modifying a displayed image to compensate for relative motion between a viewer's head and a display. In some embodiments, sensors located on a user head and on a display device may be used to measure the relative motion between a user and the display. In other embodiments, one or more imaging devices, e.g., camera, on the display device may be used to track a viewer and determine a viewer's relative position to the display.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

Figure 3:
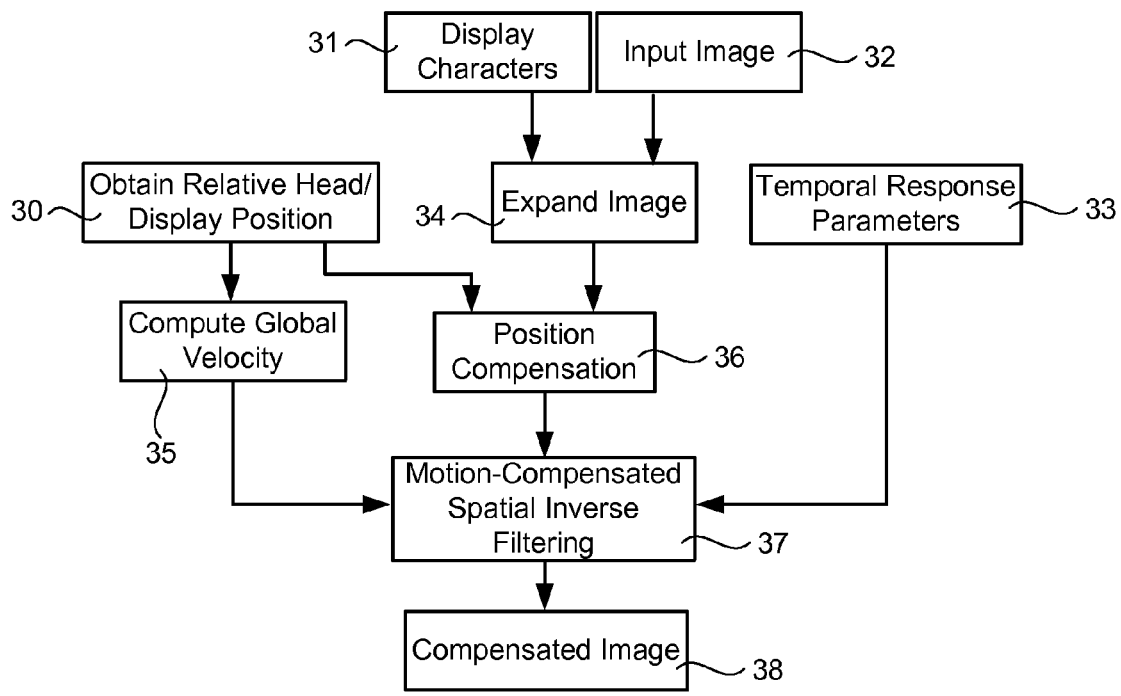
FIG. 3 is a chart showing an exemplary embodiments of the present invention comprising image expansion, position compensation and image filtering.
Figure 4:
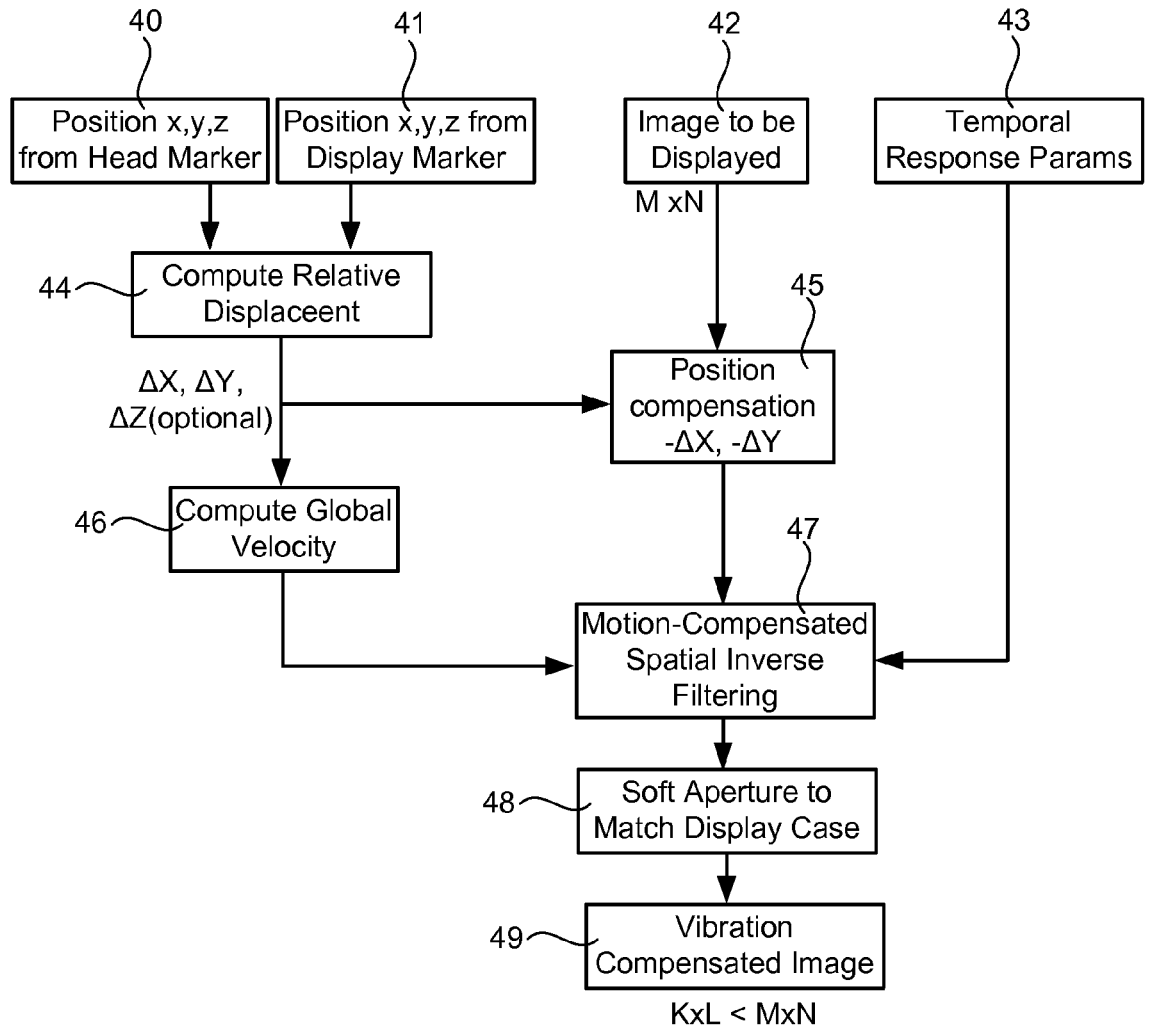
FIG. 4 is a chart showing an exemplary embodiments of the present invention comprising a soft aperture process.
Figure 10:
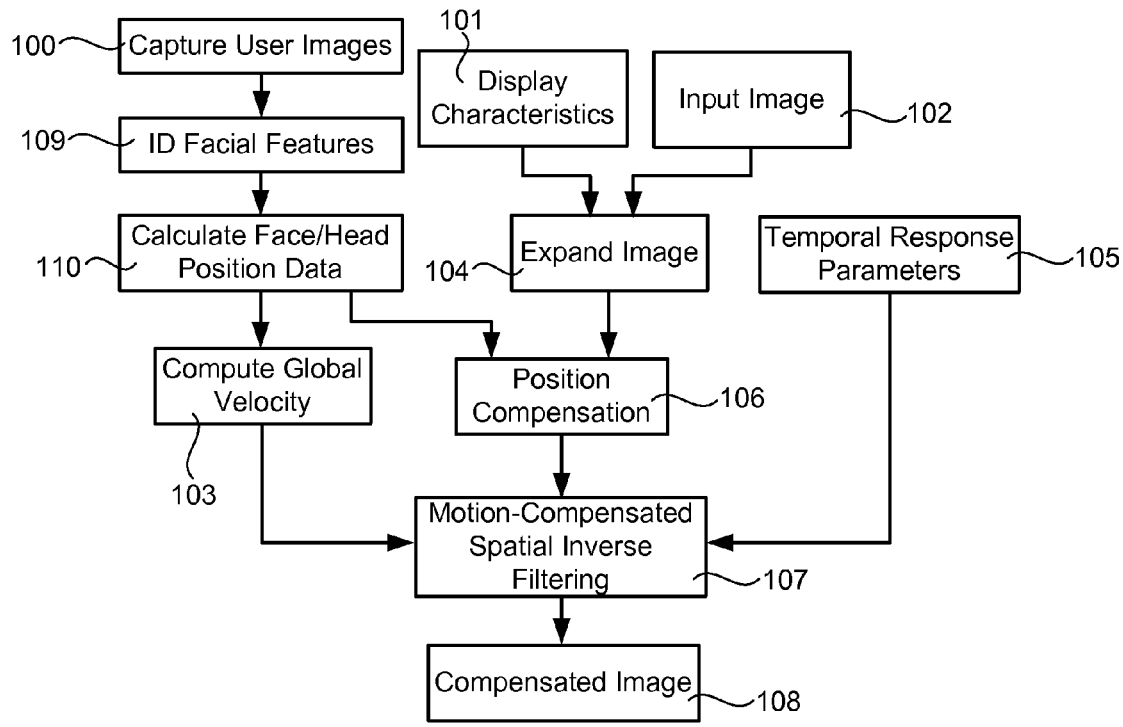
Figure 11:
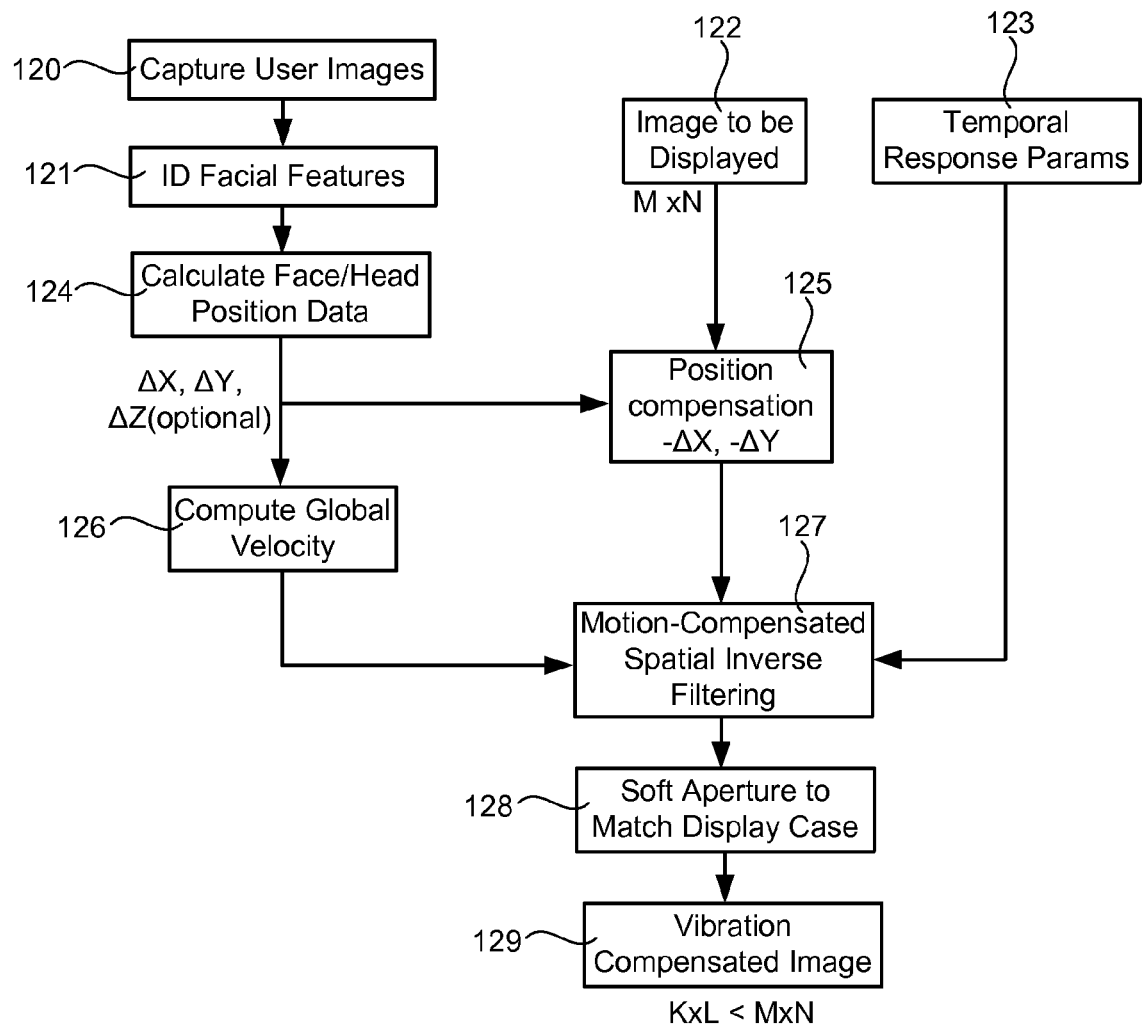

FIG. 10 is a chart showing exemplary embodiments comprising image capture, facial feature identification, and user face position data calculation combined with embodiments described in relation to FIG. 3; and FIG. 11 is a chart showing exemplary embodiments comprising image capture, facial feature identification, and user face position data calculation combined with embodiments described in relation to FIG. 4.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Embodiments of the present invention may substantially reduce the visual effects due to aperiodic vibration in mobile displays. Some embodiments may widen the field of view of a mobile display. Some embodiments may comprise a zooming technique for some motion compensation.

Embodiments of the present invention may comprise position-sensing technology to compensate the displayed image so that its relative position stays more stable in the visual field of view. While these methods create a more visually-stable image, the borders of the display may still suffer from the effects of aperiodic vibration. This can result in a fuzzy or nebulous border around the display.

Figure 1:
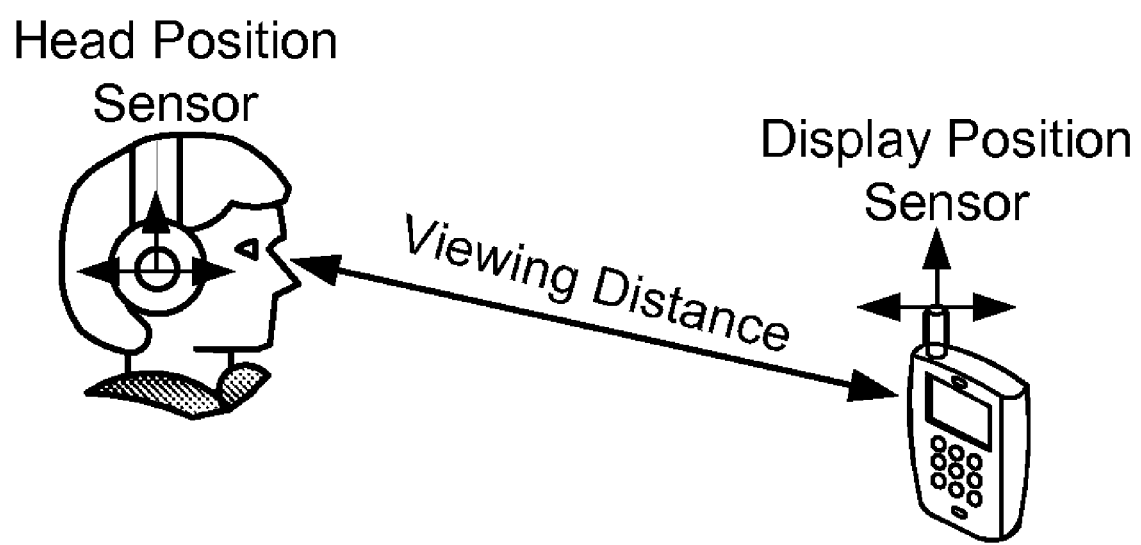
FIG. 1 is a diagram showing display viewer and exemplary sensor locations.

Some embodiments of the present invention may be described in relation to FIG. 1. These embodiments may comprise a head position sensor 2 and a display position sensor 4. In some embodiments the head position sensor 2 may be a transmitter and the display position sensor 4 may be a receiver. In other embodiments, the display position sensor 4 may comprise a transmitter and the head position sensor 2 may comprise a receiver. In some embodiments, both sensors 2 and 4 may comprise a transceiver. In some embodiments, head sensor 2 and display sensor 4 may receive or transmit signals to or from another device and may make position measurements relative to another device. In some embodiments, sensors 2 and 4 may communicate with or make measurements relative to a satellite. In some embodiments sensors 2 and 4 may make measurements relative to an electromagnetic field generated by a third device.

Some embodiments may comprise instrumentation for measuring the relative position of one sensor 2 or 4 relative to the other sensor 2 or 4. In some embodiments, the relative position of the sensors 2 and 4, may be dynamically measured. Typically, the head position sensor 2 is placed on the user's head. In some embodiments, the head sensor 2 may be attached to or integral with an audio headset, helmet, eyewear or other headgear. In some embodiments, the display sensor 4 may be attached to or integral with a display or display device.

In some embodiments, sensors 2 and 4 may measure a position and an orientation.

Some embodiments of the present invention may comprise a wireless communication link between a head sensor 2 and a display sensor 4. Some embodiments may comprise a wired connection between head sensor 2 and display sensor 4. In some embodiments a wired connection may be embedded in a user's clothing.

In some embodiments, the temporal response of the sensors 2 and 4 may be matched to the display image update rate. In some of these embodiments, the temporal response and update rate may be 60 Hz. In some embodiments, the positional accuracy of sensors 2 and 4 is within one pixel dimension. In other embodiments, the positional accuracy may be more than or a multiple of a display pixel dimension. In some embodiments, the range of the communication link between sensors 2 and 4 will be at least one meter.

An exemplary embodiment of the present invention may comprise the following specifications:
  Wireless communication
  0.038 mm resolution at 30 cm range
  7.4×4×2 cm sensor 1
  6.4×3.6×3.6 cm sensor 2
  188 Hz
  0.254 cm static accuracy
  latency 5 ms (~⅓ video frame)

Of course, some embodiments may comprise very different specifications and characteristics. In some embodiments, sensor units may be much smaller and, in some cases, may use MEMS accelerometers to reduce size. In some embodiments, multiple head and/or body sensors may be used to detect viewer location and orientation. In some embodiments, sensors may detect motion and position of multiple body elements and characteristics. In some embodiments, the viewer's head, neck, shoulders and other body parts may be tracked. In some embodiments, facial movement and conditions may be tracked to determine viewer fatigue, squinting, eye strain, and other viewer characteristics. In some embodiments, viewer eye position, movement and other characteristics, e.g., retinal characteristics, pupil dilation and other characteristics, may be measured, tracked and used for image modification to improve viewer image consumption.

In some embodiments of the present invention a source image may be treated or processed to have larger dimensions than a display. In some embodiments, a VGA image may be displayed on a QVGA display. In other embodiments, an HDTV signal may be displayed on an SDTV display. In other embodiments, an image that has the same or smaller size and resolution as a target display may be scaled, upsampled or extrapolated to a larger size for the purposes of implementing aspects of embodiments of the present invention. In some embodiments, an image may be stored in a buffer that is larger than the display.

In some embodiments of the present invention, a coordinate system may be established relative to the display. The horizontal and vertical dimension may correspond to dimensions within the plane of the display and a "z" dimension may be perpendicular to the plane of the display. In these embodiments, an image, which is larger than the display, may be shifted or translated relative to the horizontal and vertical axes in response to movement of the user's head relative to the display. In some embodiments, a zoom function may be implemented at the display in response to movement of the user's head along the z-axis relative to the display. In some embodiments, conversion from the physical position changes to image shifting units in pixels may be implemented as a mere calibration without computation.

In some embodiments, the input image may be processed or otherwise scaled to exceed the display size by an amount that is proportional to the amount of movement between a user's head and the display. This movement may be determined or sampled for a period of time prior to image display to determine the size of the image to be stored in the buffer. For video applications, a statistical sampling of the image size needed for a number of previous frames or fields may be used to determine the size of a stored video frame or field.

In embodiments of the present invention comprising Liquid Crystal Displays (LCDs) and other technologies, rapid shifting of image data on the display may lead to motion blur. This may be due to the hold-type blur of the display and/or the blur caused by the temporal response. In some embodiments, this can be corrected by performing a motion compensated inverse spatial filtering process. In these embodiments, a motion may be compensated through spatial shifting of the image relative to the display. This is typically a global motion for an entire frame to compensate for a shaking component. Consequently, the blur will have the same magnitude over the entire image and can be compensated with an inverse spatial filter depending on the motion speed and direction. In some embodiments, this inverse spatial filter may be implemented as a 1-D filter for a given video frame, but its orientation may change.

In some embodiments, this filter process may comprise one or more of the following steps:
- calculation of spatial width
- calculation of shape in amplitude
- calculation of the orientation of a global motion vector
- calculation of a 1-D oriented inverse spatial filter
- application of the inverse spatial filter to remove spatial blur Some embodiments of the present invention may comprise a soft aperture process. A display with a sharp edge surrounding the display area may suffer from diminished display quality when the display is subjected to random shaking or vibration. The shaking display can result in multiple visible display edges around the displayed image. Likewise, when an image is shifted or translated in response to relative motion between a user's head and the display, the display boundary "moves" relative to the image and can cause multiple edges to appear. This effect may be corrected, at least in part, by the use of a soft aperture. The soft aperture process allocates a strip of pixels around the boundary of the display to act as a transition zone to soften the hard edge of the display. This may be done by displaying, in the display boundary region, an image that transitions from the display image to an image that approximates the color and/or luminance of the edge of the device around the display. For example, a device with a black surround around its display may use a soft aperture that transitions to black at its exterior boundary. As another example, a device with a bright metal or white surround around its display may use a soft aperture to transition to white. Similarly, a color-display device with a colored display surround, may use a colored soft aperture.

In some embodiments, the size or extent of the soft aperture may vary in relation to the magnitude of the movement between a user's head and the display device. For example, when high amplitude vibration is present, the width of a soft aperture may increase.

Figure 2:
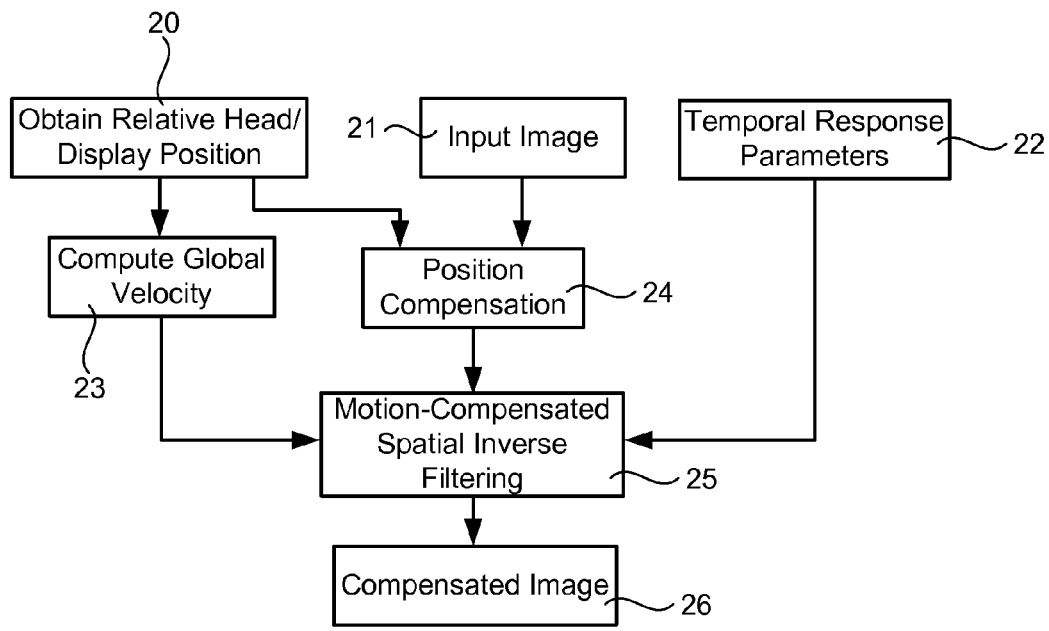
FIG. 2 is a chart showing an exemplary embodiments of the present invention comprising position compensation and filtering.

Some embodiments of the present invention may be described in relation to FIG. 2. In these embodiments, a relative head-to-display position is received 20. This may be calculated through position sensors located on a user's head and on a display, as described above. In some embodiments, the head position may be determined with a sensor in the display that measures the relative position of the user's head or with a sensor attached to the user's head that measures the relative position of the display. Other methods may also be used to determine a relative position of the user's head in relation to a display. An input image 21 may also be received. In some embodiments, the input image 21 may be a video frame or field. In some embodiments, the relative position of the head may be compared to past head position data to determine relative movement of the head in relation to a past head position. The relative head position 20 may be used to determine position compensation 24. In some embodiments, position compensation 24 may comprise shifting the image relative to the display in the direction of the user's head position. In some embodiments, position compensation 36 may comprise a zoom function. In other embodiments, position compensation 24 may comprise other compensation methods described above or other methods related to a user's head position, movement direction, velocity, acceleration or other characteristics.

In some embodiments, a global velocity may also be calculated 23. A global velocity may be calculated based on the current relative head position and past relative head positions. Temporal response parameters of the display 22 may also be received or calculated. The global velocity 23 and temporal response parameters 22 may be input to a filtering process 25. The filtering process may comprise generation and or application of a filter to compensate for motion-related blur and/or display blur caused by display response restrictions or other display characteristics. In some embodiments, the filtering process 25 may comprise motion-compensated spatial inverse filtering. In these embodiments, an image 21 is modified 24 to compensate for head position and then filtered 25 to compensate for motion-related and/or display-related blur and other effects. The result of these processes is a compensated image 26.

Some embodiments of the present invention may be described with reference to FIG. 3. In these embodiments, an input image 32 may also be received. In some embodiments, the input image 32 may be a video frame or field. Display characteristics 31 may also be received. Based on the display characteristics 31 and the input image 32 characteristics, the input image may be expanded or otherwise modified 34. In some embodiments, when an image is large enough, an image modification process 34 may not need to modify the input image and may simply pass the image on to the position compensation process 36. In other embodiments and situations, the image modification process 34 may upsample, scale or extrapolate an image to provide enough data for an image buffer that is larger than the associated display.

In some embodiments, a relative head-to-display position may also be received 30. This may be calculated through position sensors located on a user's head and on a display, as described above. In some embodiments, the head position may be determined with a sensor in the display that measures the relative position of the user's head or with a sensor attached to the user's head that measures the relative position of the display. Other methods may also be used to determine a relative position of the user's head in relation to a display. In some embodiments, the relative position of the head may be compared to past head position data to determine relative movement of the head in relation to a past head position. The relative head position 30 may be used to determine a position compensation 36. In some embodiments, position compensation 36 may comprise shifting the image relative to the display in the direction of the user's head position. In some embodiments, position compensation 36 may comprise a zoom function. In other embodiments, position compensation 36 may comprise other compensation methods described above or other methods related to a user's head position, movement direction, velocity, acceleration or other characteristics.

In some embodiments, a global velocity may also be calculated 35. A global velocity may be calculated based on the current relative head position and past relative head positions. Temporal response parameters of the display 33 may also be received or calculated. The global velocity 35 and temporal response parameters 33 may be input to a filtering process 37. The filtering process may comprise generation and or application of a filter to compensate for motion-related blur and/or display blur caused by display response restrictions or other display characteristics. In some embodiments, the filtering process 37 may comprise motion-compensated spatial inverse filtering. In these embodiments, an image 32 may be modified 34 to an adequate image size, modified 36 to compensate for head position and then filtered 37 to compensate for motion-related and/or display-related blur and other effects. The result of these processes is a compensated image 38.

Some embodiments of the present invention may be described with reference to FIG. 4. In these embodiments, an input image 42 may also be received. In some embodiments, the input image 42 may be a video frame or field. In some embodiments, a relative head-to-display position may also be received or calculated 44. This may be calculated through position sensors located on a user's head and on a display, as described above. In some embodiments, the head position may be determined with a sensor in the display that measures the relative position of the user's head or with a sensor attached to the user's head that measures the relative position of the display. In some embodiments, a head position coordinate 40 may be received. In some embodiments, a display position coordinate may be received 41. With these coordinates, a relative displacement of position may be calculated 44. Other methods may also be used to determine a relative position of the user's head in relation to a display. In some embodiments, the relative position of the head may be compared to past head position data to determine relative movement of the head in relation to a past head position. The relative head position 44 may be used to determine a position compensation 45. In some embodiments, position compensation 45 may comprise shifting the image relative to the display in the direction of the user's head position. In some embodiments, position compensation 45 may comprise a zoom function. In other embodiments, position compensation 45 may comprise other compensation methods described above or other methods related to a user's head position, movement direction, velocity, acceleration or other characteristics.

In some embodiments of the present invention, the distance between a viewer's head and the display may be monitored. When the head-to-display distance changes, the display may perform a zoom function to compensate for the distance change. In some embodiments, the zoom process may be proportional to the change in distance between a user's head and the display.

In some embodiments, a global velocity may also be calculated 46. A global velocity 46 may be calculated based on the current relative head position and past relative head positions. Temporal response parameters of the display 43 may also be received or calculated. The global velocity 46 and temporal response parameters 43 may be input to a filtering process 47. The filtering process 47 may comprise generation and or application of a filter to compensate for motion-related blur and/or display blur caused by display response restrictions or other display characteristics. In some embodiments, the filtering process 47 may comprise motion-compensated spatial inverse filtering.

Some embodiments of the present invention may comprise a soft aperture process 48. In these embodiments, a region of pixels around the periphery of the display may be allocated as a soft aperture wherein the image transitions to the appearance of the display surround thereby eliminating or reducing hard edges around the display.

In these embodiments, an image 42 may be modified 45 to compensate for head position and then filtered 47 to compensate for motion-related and/or display-related blur and other effects. A soft aperture process 48 may then be applied to the modified and filtered image. The result of these processes is a compensated image 49.

Some embodiments of the present invention may comprise an imaging device, which may be used to track a viewer's features and determine the location of the viewer in relation to the display. These embodiments may comprise face tracking, gaze tracking or other algorithms, which recognize viewer features and monitor changes in these features to detect a viewer's relative motion in relation to the display device.

In some embodiments, face detection or facial feature detection methods may be used. These methods may comprise feature-based approaches wherein facial features such as eyes, mouth and nose are detected based on feature shapes, relative location, other geometry and other characteristics. A set of facial features may be identified and tracked to detect viewer motion relative to the display device. In some embodiments, one or more of an eye feature, a nose feature, a mouth feature and a facial shape feature may be determined and tracked. In some embodiments, a relationship between these features may be determined. In some embodiments, this relationship may be a geometric relationship. In some embodiments, this relationship may be a relative distance metric or a relative angular relationship or combination thereof. In some embodiments, a feature shape or characteristics of a feature shape may be used to identify and track a viewer's relative position in relation to a display device.

In some embodiments, face or facial feature detection may also comprise motion-based approaches wherein successive image frames are evaluated to find motion between frames. Some embodiments may evaluate shapes or features found in a difference image and track these shapes or features to estimate viewer motion relative to a display device.

In some embodiments, face or facial feature detection and tracking may comprise color-based approaches. In these embodiments, objects with skin-tone colors may be detected. In some embodiments, the size, shape and color characteristics of a skin-tone object may be used.

In some embodiments, a combination of a feature-based approach, a motion-based approach and a color-based approach may be used to detect and track one or more facial features.

Figure 5:
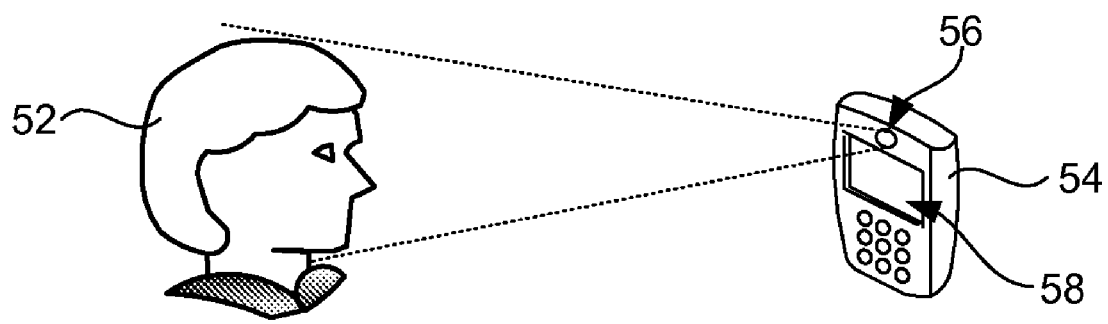
FIG. 5 is a diagram showing an exemplary display device with an on-board camera for viewer tracking.

Some embodiments of the present invention may be described with reference to FIG. 5. In these embodiments, a display device 54 may comprise a display 58 for display of content to a user 52. The display device 54 may also comprise or be connected to an imaging device 56, such as a camera. In some embodiments, the imaging device 56 may be integral to or physically connected to the display device 54 such that the imaging device 56 maintains a fixed positional relationship to the display device 54. In this manner, the relative position of the imaging device 56 in relation to the display device 54 is known and fixed. In other embodiments, the imaging device 56 may be physically separate from the display device 54 and have a varying position relative to the display device 54, but may track its relative position to the display device 54 with sensors such as has been described above for the head position sensors and display position sensors in above-described embodiments. Other methods may also be used to track the relative position of the imaging device 56 to the display device 54.

Figure 6:
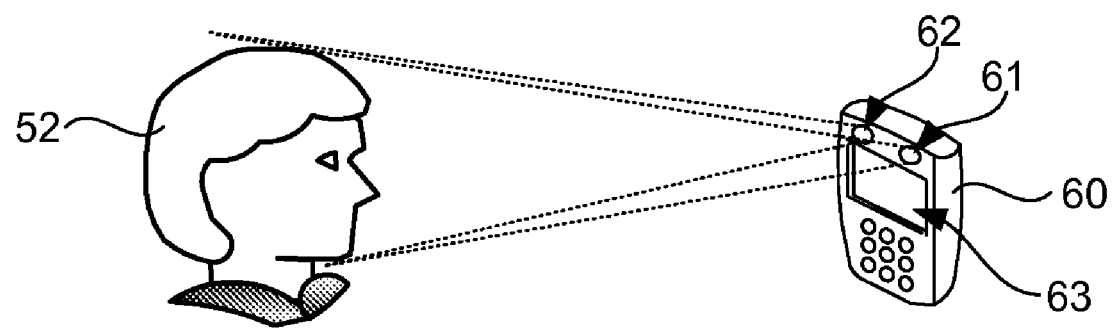
FIG. 6 is a diagram showing an exemplary display device with multiple on-board imaging devices for viewer tracking.

Some embodiments of the present invention may be described with reference to FIG. 6. In these embodiments, a display device 6 may comprise a display 63 for display of content to a user 52. The display device 60 may also comprise or be connected to a plurality of imaging devices 61 & 62, such as cameras. In some embodiments, the imaging devices 61 & 62 may be integral to or physically connected to the display device 60 such that the imaging devices 61 & 62 maintain a fixed positional relationship to the display device 60. In this manner, the relative position of the imaging devices 61 & 62 in relation to the display device 60 is known and fixed. In other embodiments, the imaging devices 61 & 62 may be physically separate from the display device 60 and have a varying position relative to the display device 60, but may track its relative position to the display device 60 with sensors such as has been described above for the head position sensors and display position sensors in above-described embodiments. Other methods may also be used to track the relative position of the imaging devices 61 & 62 to the display device 60.

Figure 7:
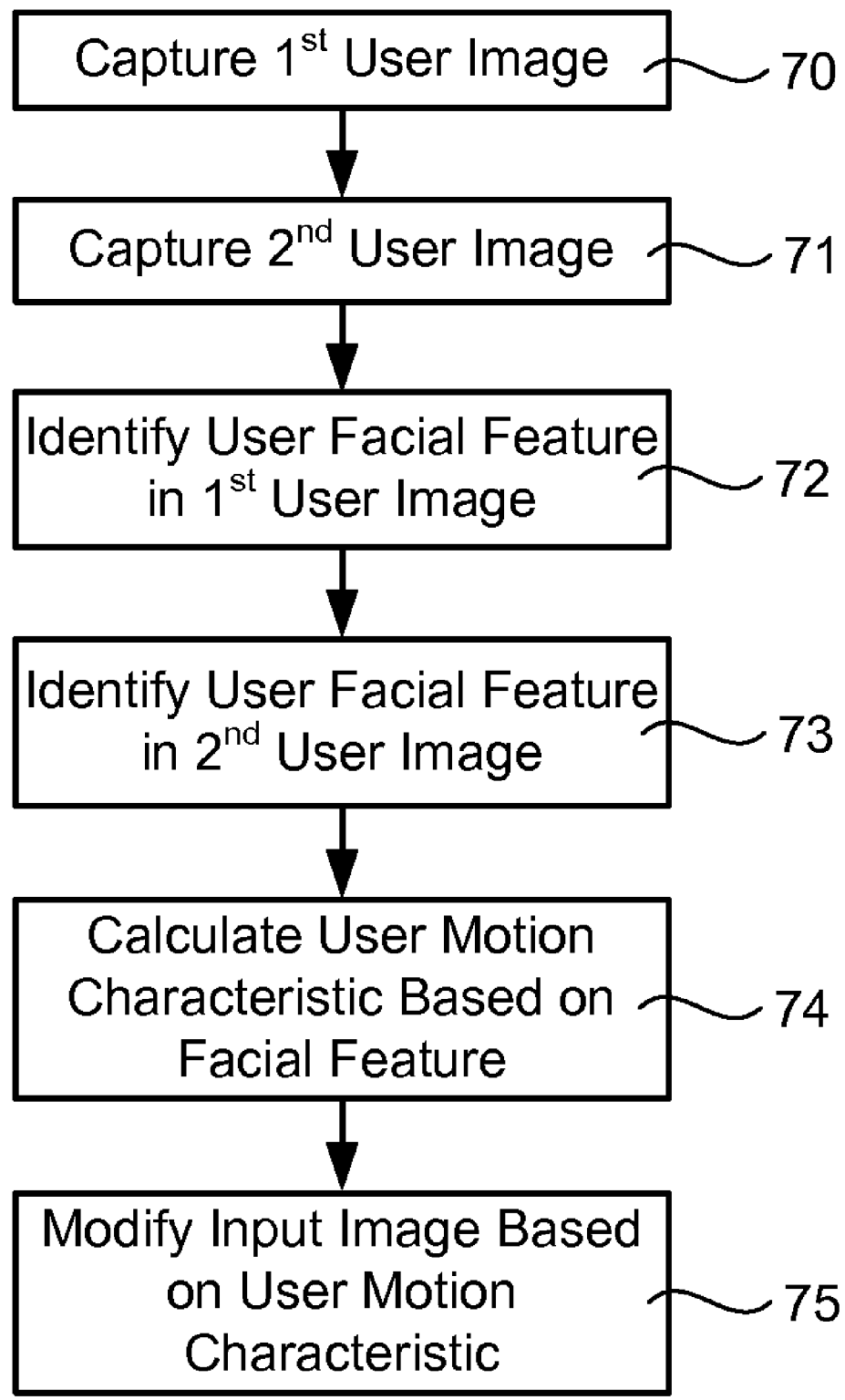
FIG. 7 is a chart showing exemplary embodiments comprising calculation of a user motion characteristic based on facial features identified in captured images.

Elements of some embodiments of the present invention may be described with reference to FIG. 7. In these embodiments, an imaging device related to a display device may capture 70 a first user image of a display device user. This image will typically comprise a view of the user's head and face. A second user image may also be captured 71 at a different time than the first user image. In some embodiments, a first set of user images may be captured at the same time and another set of user images may be captured at another time.

After user images are captured, user facial features or face indicators may be identified 72 in a first user image captured at a first time interval. These facial features or face indicators may be related to feature shape, size, color, location and other characteristics. In some embodiments, facial features or face indicators may be identified and tracked using methods described in U.S. Pat. No. 7,181,050, entitled "Method for Adapting Quantization in Video Coding Using Face Detection and Visual Eccentricity Weighting;" U.S. Pat. No. 6,404,900, entitled "Method for Robust Human Face Tracking in Presence of Multiple Persons;" and U.S. Pat. No. 6,173,069, entitled "Method for Adapting Quantization in Video Coding Using Face Detection and Visual Eccentricity Weighting;" which are incorporated herein by reference. These same facial features or face indicators may also be identified 73 in a second user image.

Once facial features or face indicators are identified in at least two user images captured at different times, a user motion characteristic may be calculated 74 over the time interval between the image capture times. A user motion characteristic may comprise a user velocity, user acceleration, user motion vector, user motion direction or another motion characteristic related to relative motion between a user and a display device. In some embodiments, a user motion characteristic may comprise a two-dimensional component in a plane that is substantially parallel with the plane of the display device display surface. In some embodiments, a user motion characteristic may comprise a three-dimensional component that comprises an element related to the distance between a user and a display device.

In some embodiments, user motion in a direction between the user and the display device may be determined through the use of multiple user images captured from different perspectives at the same time. This may be performed with a device, as shown in FIG. 6 with multiple imaging device apertures 61 & 62 or by other methods. These embodiments may comprise stereoscopic methods.

In some embodiments, a user facial feature or face indicator combined with a user input and accelerometer data may be used to detect user motion relative to a display device. In these embodiments, a user image may be captured at the time a user makes an input, such as keypad, stylus, touch-screen or other input. In these embodiments, the input indicates that the user is facing the display and the image can be used as a basis for further motion calculation. Accelerometer data from the point of user image capture may then be used to determine a user position. In some embodiments, the integral of acceleration or accelerometer data can yield velocity and the integral of velocity can yield position data. Therefore, a basis user image and subsequent accelerometer data can be used to track a user motion characteristic, such as user position.

When the user motion characteristic is determined, the input image may be modified 75 in response to the user motion characteristic. In some embodiments, modification 75 may comprise shifting an image in a direction substantially parallel with the direction of the user motion characteristic. In some embodiments, when a user moves in a direction relative to the display, the displayed image may be shifted in the direction of user movement. In some embodiments, input image modification may comprise a zoom function wherein the displayed image is displayed in a zoomed-in or zoomed-out condition in response to user movement in a direction between the user and the display device. In some embodiments, input image modification 75 may comprise motion-compensated spatial inverse filtering.

Figure 8:
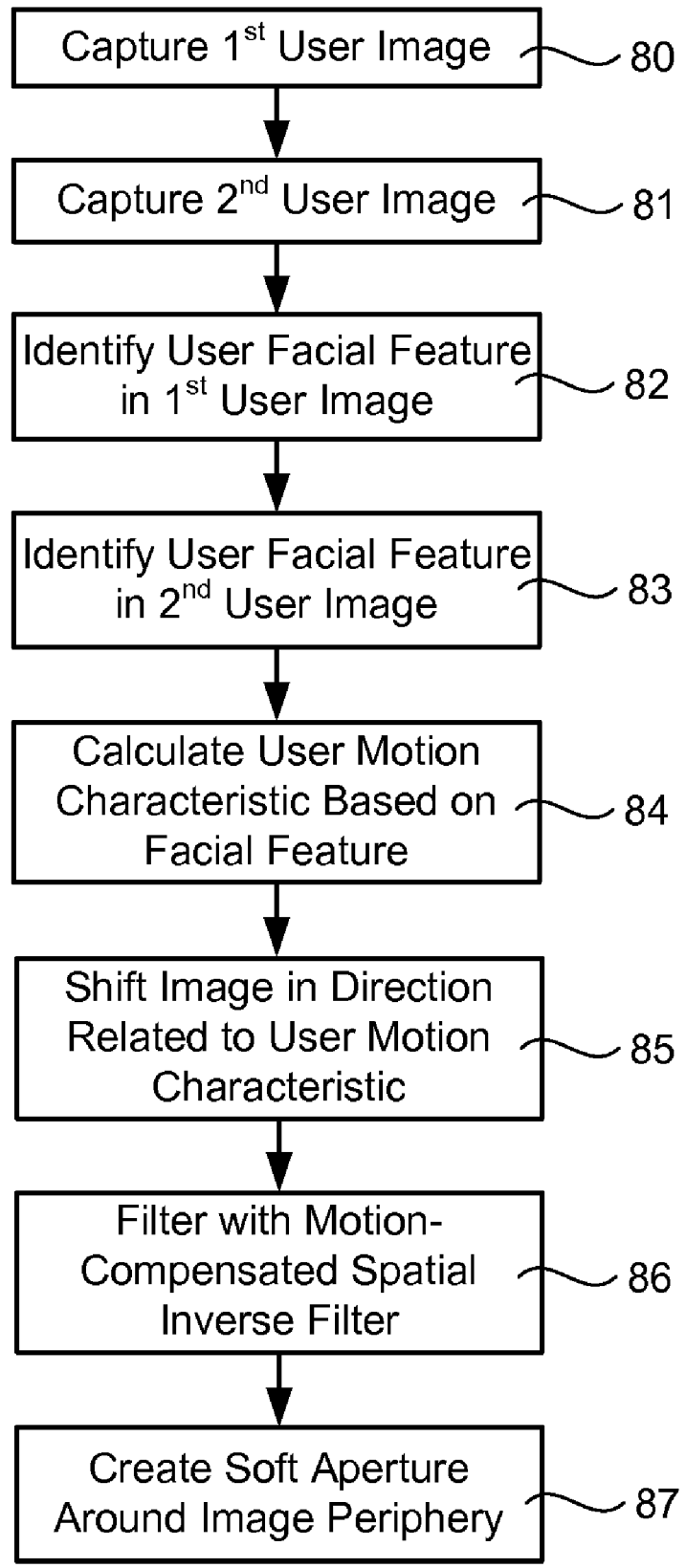
FIG. 8 is a chart showing exemplary embodiments comprising application of a motion-compensated spatial inverse filter.

Some embodiments of the present invention may be described with reference to FIG. 8. In these embodiments, a first user image 80 and a second user image 81 are captured and user facial features are identified 82 & 83 in each of the user images. A user motion characteristic is then calculated 84 from motion of the identified facial features between the two or more user images. Based on the user motion characteristic, the input image may be modified 85 to accommodate the user movement. In some embodiments, this modification 85 may comprise shifting the input image displayed on the display device to accommodate user motion parallel to the plane of the display panel. In some embodiments, this modification 85 may comprise performing a zoom function on the image to accommodate user motion perpendicular to the plane of the display panel.

In some embodiments, motion-compensated spatial inverse filtering 86 may also be applied to the input image. In some embodiments, a soft aperture effect can also be applied to the periphery of the image. In some embodiments, the soft aperture may be created in a color that matches that of the display device around the image display panel. In some embodiments, the width of the soft aperture effect may be varied in proportion to the magnitude of the user motion characteristic.

Figure 9:
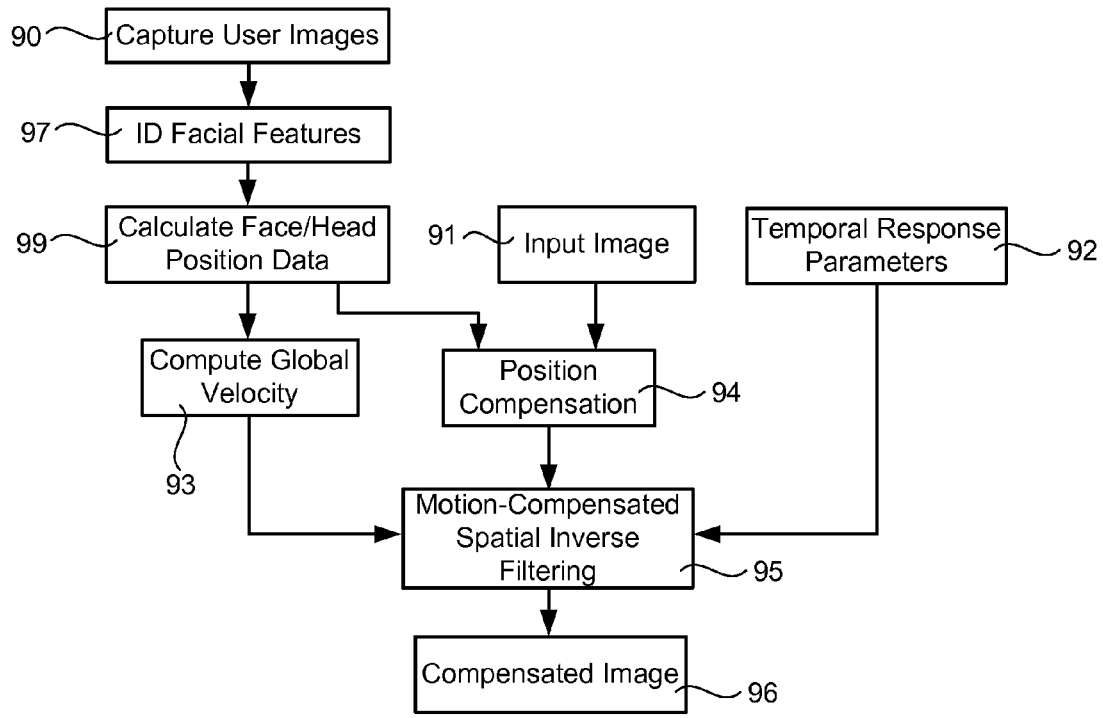
FIG. 9 is a chart showing exemplary embodiments comprising image capture, facial feature identification, and user face position data calculation combined with embodiments described in relation to FIG. 2.

Aspects of some embodiments of the present invention may be described in relation to FIG. 9. In these embodiments, a relative head-to-display position is determined through captured user images 90 from an imaging device. A user's facial feature may be identified 97 in these images and the user's face or head position may be calculated 99 based on the identified facial features. A time interval between the capture times of the user images may also be determined and a global velocity may be computed 93 this position and timing data.

An input image 91 may also be received. In some embodiments, the input image 91 may be a video frame or field. In some embodiments, the relative position of the head may be compared to past head position data from one or more prior user images to determine relative movement of the head in relation to a past head position. The relative head position 99 may be used to determine position compensation 94. In some embodiments, position compensation 94 may comprise shifting the image relative to the display in the direction of the user's head position. In some embodiments, position compensation 94 may comprise a zoom function. In other embodiments, position compensation 94 may comprise other compensation methods described above or other methods related to a user's head position, movement direction, velocity, acceleration or other characteristics.

In some embodiments, a global velocity may also be calculated 93. A global velocity may be calculated based on the current relative head position and past relative head positions. Temporal response parameters of the display 92 may also be received or calculated. The global velocity 93 and temporal response parameters 92 may be input to a filtering process 95. The filtering process may comprise generation and or application of a filter to compensate for motion-related blur and/or display blur caused by display response restrictions or other display characteristics. In some embodiments, the filtering process 95 may comprise motion-compensated spatial inverse filtering. In these embodiments, an image 91 is modified 94 to compensate for head position and then filtered 95 to compensate for motion-related and/or display-related blur and other effects. The result of these processes is a compensated image 96.

Some embodiments of the present invention may be described with reference to FIG. 10. In these embodiments, an input image 102 may also be received. In some embodiments, the input image 102 may be a video frame or field. Display characteristics 101 may also be received. Based on the display characteristics 101 and the input image characteristics 102, the input image may be expanded or otherwise modified 104. In some embodiments, when an image is large enough, an image modification process 104 may not need to modify the input image and may simply pass the image on to the position compensation process 106. In other embodiments and situations, the image modification process 104 may upsample, scale or extrapolate an image to provide enough data for an image buffer that is larger than the associated display.

In some embodiments, a relative head-to-display position is determined through captured user images 100 from an imaging device. A user's facial feature may be identified 109 in these images and the user's face or head position may be calculated 110 based on the identified facial features. A time interval between the capture times of the user images may also be determined and a global velocity may be computed 103 based on this position and timing data.

The relative head position 110 may be used to determine a position compensation 106. In some embodiments, position compensation 106 may comprise shifting the image relative to the display in the direction of the user's head position. In some embodiments, position compensation 106 may comprise a zoom function. In other embodiments, position compensation 106 may comprise other compensation methods described above or other methods related to a user's head position, movement direction, velocity, acceleration or other characteristics.

Temporal response parameters of the display 105 may also be received or calculated. The global velocity 103 and temporal response parameters 105 may be input to a filtering process 107. The filtering process may comprise generation and or application of a filter to compensate for motion-related blur and/or display blur caused by display response restrictions or other display characteristics. In some embodiments, the filtering process 107 may comprise motion-compensated spatial inverse filtering. In these embodiments, an image 102 may be modified 104 to an adequate image size, modified 106 to compensate for head position and then filtered 107 to compensate for motion-related and/or display-related blur and other effects. The result of these processes is a compensated image 108.

Some embodiments of the present invention may be described with reference to FIG. 11. In these embodiments, an input image 122 may also be received. In some embodiments, the input image 122 may be a video frame or field.

In some embodiments, a relative head-to-display position is determined through captured user images 120 from an imaging device. A user's facial feature may be identified 121 in these images and the user's face or head position may be calculated 130 based on the identified facial features. A time interval between the capture times of the user images may also be determined and a global velocity may be computed 126 based on this position and timing data.

The face/head position data 124 may be used to determine a position compensation 125. In some embodiments, position compensation 125 may comprise shifting the image relative to the display in the direction of the user's head position. In some embodiments, position compensation 125 may comprise a zoom function. In other embodiments, position compensation 125 may comprise other compensation methods described above or other methods related to a user's head position, movement direction, velocity, acceleration or other characteristics.

In some embodiments of the present invention, the distance between a viewer's head and the display may be monitored. When the head-to-display distance changes, the display may perform a zoom function to compensate for the distance change. In some embodiments, the zoom process may be proportional to the change in distance between a user's head and the display.

In some embodiments, a global velocity may also be calculated 126. A global velocity 126 may be calculated based on the current relative head position and past relative head positions. Temporal response parameters of the display 123 may also be received or calculated. The global velocity 126 and temporal response parameters 123 may be input to a filtering process 127. The filtering process 127 may comprise generation and or application of a filter to compensate for motion-related blur and/or display blur caused by display response restrictions or other display characteristics. In some embodiments, the filtering process 127 may comprise motion-compensated spatial inverse filtering.

Some embodiments of the present invention may comprise a soft aperture process 128. In these embodiments, a region of pixels around the periphery of the display may be allocated as a soft aperture wherein the image transitions to the appearance of the display surround thereby eliminating or reducing hard edges around the display.

In these embodiments, an image 122 may be modified 125 to compensate for head position or movement and then filtered 127 to compensate for motion-related and/or display-related blur and other effects. A soft aperture process 128 may then be applied to the modified and filtered image. The result of these processes is a compensated image 129.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for displaying a motion-compensated image, said method comprising:
    a) capturing a first user image of a user of a display device with an imaging device;
    b) identifying a user facial feature in said first user image;
    c) calculating a first user position relative to said display device from said user facial feature;
    d) capturing a second user image of said user of said display device with said imaging device;
    e) identifying said user facial feature in said second user image;
    f) calculating a second user position relative to said display device from said user facial feature;
    g) calculating a user motion characteristic using said first user position and said second user position
    h) receiving an input image;

i) modifying said input image by shifting said image relative to said display device in a direction related to said user motion characteristic, thereby creating a modified input image;

j) applying a soft aperture region to said modified input image, wherein the extent of said soft aperture region varies with the magnitude of said user motion characteristic.

2. A method as described in claim 1 further comprising filtering said modified image to compensate for image blur due to display temporal response, thereby creating a filtered, modified input image.

3. A method as described in claim 2 wherein said filtering comprises a motion-compensated spatial inverse filtering operation.

4. A method as described in claim 2 wherein said filtering is based on display temporal response parameters.

5. A method as described in claim 2 wherein said filtering is based on a global velocity of said input image relative to said display.

6. A method as described in claim 1 further comprising modifying said input image with a zoom operation in response to said user motion characteristic indicating motion of said user's head in the direction of said display device.

7. A method as described in claim 1 further comprising expanding said input image to a size that is larger than the size of said display.

8. A method as described in claim 1 wherein said soft aperture region comprises matching a color in a soft aperture region to a display device color surrounding a display screen on said display device.

9. A system for displaying a motion-compensated image with a display device, said system comprising:

a) an imaging device for capturing user images of a user of a display device ;

b) a facial feature or face indicator identifier for identifying a user facial feature or face indicator in said user images;

c) a user position calculator for calculating a user position relative to said display device using said user facial feature;

d) a motion characteristic calculator for calculating a user motion characteristic using a plurality of said user positions calculated with said user position calculator;

e) an image receiver for receiving an input image;

f) an image modifier for modifying said input image by shifting said image relative to said display in a direction related to said user motion characteristic, thereby creating a modified input image; and g) a soft aperture processor for applying a soft aperture region to said input image, wherein the extent of said soft aperture region applied by said soft aperture processor varies with the magnitude of a change in position of a user's head relative to said display.

10. A system as described in claim 9 wherein said image modifier further modifies said input image with a zoom operation in response to a distance between said user's head and said display as determined with said user motion characteristic.

11. A system as described in claim 9 further comprising a filter for filtering said modified image to compensate for image blur.

12. A system as described in claim 11 wherein said filtering comprises a motion-compensated spatial inverse filtering operation.

13. A system as described in claim 11 wherein said filtering is based on a display temporal response.

14. A system as described in claim 11 wherein said filtering is based on a global velocity of said input image relative to said display.

15. A system as described in claim 9 wherein said soft aperture processor matches a color in a soft aperture region to a display case color under ambient illumination.

\* \* \* \* \*